US009648382B2

(12) United States Patent
Nakamura et al.

(10) Patent No.: US 9,648,382 B2
(45) Date of Patent: May 9, 2017

(54) DISPLAY APPARATUS, DISPLAY SYSTEM AND STORAGE MEDIUM (71) Applicants: Rie Nakamura, Tokyo (JP); Daisuke Sakai, Tokyo (JP); Osamu Torii, Kanagawa (JP); Hiroki Ozaki, Tokyo (JP); Kazuya Fujikawa, Tokyo (JP)

(72) Inventors: Rie Nakamura, Tokyo (JP); Daisuke Sakai, Tokyo (JP); Osamu Torii, Kanagawa (JP); Hiroki Ozaki, Tokyo (JP); Kazuya Fujikawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 347 days.

(21) Appl. No.: 14/305,344

(22) Filed: Jun. 16, 2014

(65) Prior Publication Data
US 2014/0379751 A1 Dec. 25, 2014

(30) Foreign Application Priority Data
Jun. 21, 2013 (JP) .................................. 2013-130637

(51) Int. Cl.
G06F 17/30 (2006.01)
H04N 21/436 (2011.01)
H04N 21/442 (2011.01)
H04N 21/45 (2011.01)
H04N 21/482 (2011.01)
H04N 21/485 (2011.01)
H04L 12/28 (2006.01)

(52) U.S. Cl.
CPC ... *H04N 21/43615* (2013.01); *H04L 12/2809* (2013.01); *H04L 12/2812* (2013.01); *H04N 21/44227* (2013.01); *H04N 21/4516* (2013.01); *H04N 21/482* (2013.01); *H04N 21/485* (2013.01); *H04L 2012/2849* (2013.01)

(58) Field of Classification Search
None
See application file for complete search history.

(56) References Cited

U.S. PATENT DOCUMENTS

2010/0198915 A1 8/2010 Mashita et al.
2010/0333209 A1* 12/2010 Alve ....................... G06F 21/10 726/26
2013/0055303 A1* 2/2013 Kannan ............... H04L 41/0893 725/25

FOREIGN PATENT DOCUMENTS

JP 2009-086157 4/2009
JP 2012-159765 8/2012

* cited by examiner

Primary Examiner — Anh Tai Tran
(74) Attorney, Agent, or Firm — Oblon, McClelland, Maier & Neustadt, L.L.P.

(57) ABSTRACT

A display apparatus connected to a content server via a network, includes a content acquisition unit that acquires content with an input format; an input format detection unit that detects an input format of content to be acquired; a storage unit that stores information on the content server connected to the display apparatus; a server search unit that searches for a content server in the network; and a server connection unit that, upon the input format detection unit detecting that the input format of the content to be acquired is an input format of content acquired from a content server, connects to at least one of a content server specified by the information stored in the storage unit and a content server searched for and detected by the server search unit.

19 Claims, 11 Drawing Sheets

| SETUP OF NETWORK APPLICATION | | |
|---|---|---|
| LOCATION FREE | INFORMATION ON LOCATION FREE SETUP CAN BE REGISTERED AND CONFIRMED. | |
| PJLink | ROOT URL | 172.25.XXX.XXX |
| @Remote | INDEX FILE | |
| STATUS DISPLAY | KIND OF ACCESS RESTRICTION | NONE |
| SECURITY | | ACCESS NUMBER |

| SERVER ID | NAME OF SERVER | ROOT URL | INDEX FILE | KIND OF ACCESS RESTRICTION |
|---|---|---|---|---|
| 1 | XXX SERVER | 172.25.XXX.XXX | — | NO |

FIG.9

| SERVER ID | NAME OF SERVER | ROOT URL | STANDARD |
|---|---|---|---|
| 1 | XXX SERVER | 172.25.XXX.XXX | xLFP |
| 2 | BOZ-TR500V | 172.24.XXX.XXX | DLNA |
| 3 | TRV¥3000Z | 172.23.XXX.XXX | DLNA |

DISPLAY APPARATUS, DISPLAY SYSTEM AND STORAGE MEDIUM

BACKGROUND OF THE INVENTION

1. Field of the Invention

The disclosures herein generally relate to a display apparatus, a display system and a storage medium

2. Description of the Related Art

Recently, server content output functions which acquire content from a server connected to a home network and output the content to a display device such as a projector have been realized according to the UPnP (Universal Plug and Play).

Standards of such functions adapting the UPnP include, for example, the DLNA (Digital Living Network Alliance). A use of a DMS (Digital Media Server) for storing digital content compliant with the DLNA guideline has become widespread. The DMS will be simply called "server" in the following. The DMS is connected to a home network, and content in the DMS is displayed on a display device.

Japanese Published Patent Application No. 2009-86157 discloses one of the above-described related art cases. In Japanese Published Patent Application No. 2009-86157, a display device detects automatically, only by turning on the display device, a connection condition of a server (DMS) compliant with the DLNA guideline existing on a network. When a connection of the server is detected, content which is open at the server is acquired and the content is automatically reproduced.

The display device in the related art automatically detects a server which has not been set in advance, and reproduces content in the server automatically.

However, the display device in the related art performs a series of processes from detecting a server to reproducing content, which the detected server has, unambiguously (automatically). Accordingly, a user cannot select a server storing content which the user desires to reproduce.

SUMMARY OF THE INVENTION

It is a general object of at least one embodiment of the present invention to provide a display apparatus, a display system and a storage medium that substantially obviate one or more problems caused by the limitations and disadvantages of the related art.

In one embodiment, a display apparatus connected to a content server via a network, includes a content acquisition unit that acquires content with an input format; an input format detection unit that detects an input format of content to be acquired; a storage unit that stores information on the content server connected to the display apparatus; a server search unit that searches for a content server in the network; and a server connection unit that, upon the input format detection unit detecting that the input format of the content to be acquired is an input format of content acquired from a content server, connects to at least one of a content server specified by the information stored in the storage unit and a content server searched for and detected by the server search unit.

In another embodiment, a display system includes a display apparatus and a content server which is connected to the display apparatus via a network. The display apparatus includes a content acquisition unit that acquires content with an input format; an input format detection unit that detects an input format of content to be acquired; a storage unit that stores information on the content server connected to the display apparatus; a server search unit that searches for a content server in the network; a server connection unit that, upon the input format detection unit detecting that the input format of the content to be acquired is an input format of content acquired from a content server, connects to at least one of a content server specified by the information stored in the storage unit and a content server searched for and detected by the server search unit; and a server list display unit that displays a list of the content server to which the server connection unit connects.

In yet another embodiment, a non-transitory computer-readable storage medium stores a program for causing a display apparatus that is connected to a content server via a network and includes a storage unit that stores information on the content server connected to the display apparatus, to perform a process of displaying content. The process includes a content acquisition step of acquiring content with an input format; an input format detection step of detecting an input format of content to be acquired; a server search step of searching for a content server in the network; and a server connection step of, upon detecting that the input format of the content to be acquired is an input format of content acquired from a content server, connecting to at least one of a content server specified by the information stored in the storage unit and a content server searched for and detected in the server search step.

According to the embodiment of the present invention, a display device which realizes appropriate connection control and makes a selection of a server having content which a user desires to output performs effectively.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.

<Display System: Schematic Configuration>

Figure 1:
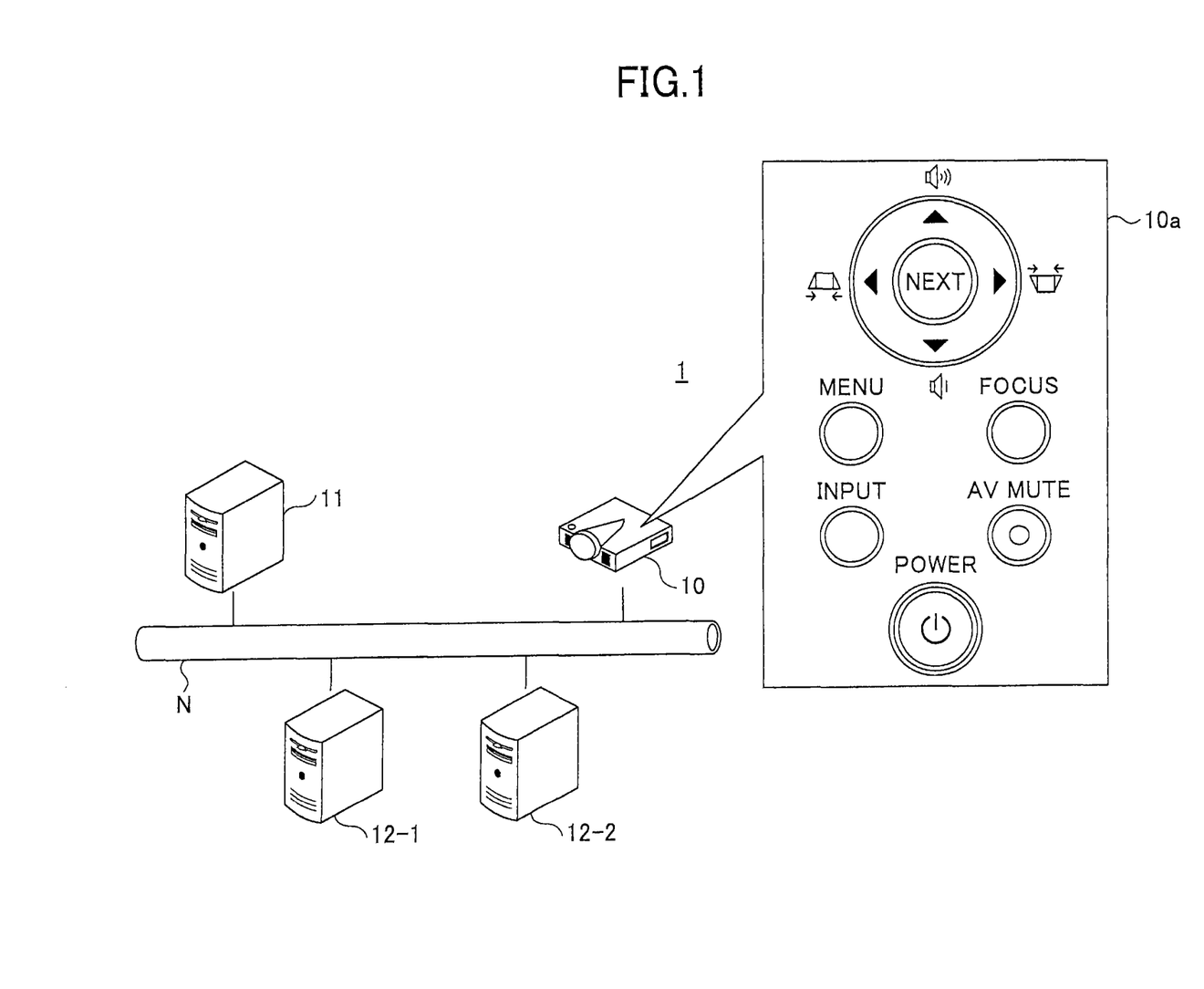
FIG. 1 is a diagram illustrating an example of a schematic configuration of a display system according to a present embodiment.

FIG. 1 is a diagram illustrating an example of a schematic configuration of a display system according to the present embodiment. The display system shown in FIG. 1 includes a projector 10 as an example of a display device, a content server 11 and a content server 12 which has a different output function from the content server 11. The projector 10, the content server 11 and the content server 12 are connected via a network N so that they can communicate with each other. Meanwhile, the number of each device shown in FIG. 1 is not limited to that in FIG. 1.

The projector 10 has a projection function by a network input conforming, for example, to the UPnP (Universal Plug and Play) or a projection function by plural network inputs such as a dedicated utility program for projecting an image (screen) of a PC on a screen and displaying it. A main body of the projector 10 has an operation unit 10a for operating "menu", "focus", "input", "selection, determination", "On/off of power" or the like of the projector 10 shown in FIG. 1, for example.

Figure 3:
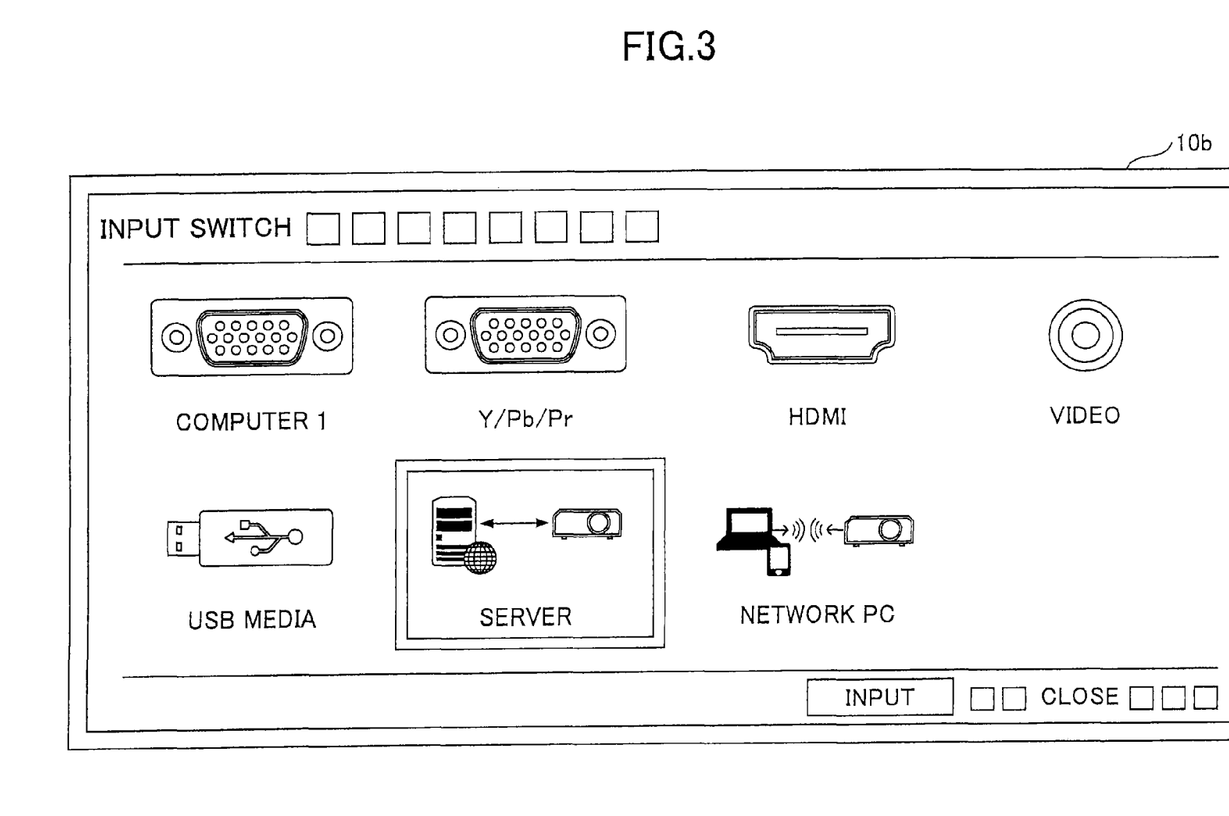
FIG. 3 is a diagram illustrating an example of an input switch screen according to the present embodiment.

Moreover, the display device 10 is compatible with plural input types for acquiring content from various kinds of media. For example, in an input type switch interface 10b, as shown in FIG. 3, input types such as "computer 1", "Y/Pb/Pr", "HDMI (trademark registered) (High Definition Multimedia Interface)", "USB (Universal Serial Bus) media", "server", or "network PC" are available. In the present embodiment, the input types include the input from a "server".

Incidentally, a user can switch an input type to a "content server", by selecting, for example, "server" from the input types displayed on the input type switch interface 10b, as explained above.

Meanwhile, the display device according to the present embodiment is not limited to the projector 10, but may include generally a device that can display content such as an image, a video picture, or characters on a screen such as a display unit or a touch panel. Furthermore, the meaning of the projection in the present embodiment is not limited to merely projecting content on a predetermined screen, but includes a concept of display as necessary.

The content server 11 is a content server initially connected to the network. The content server 11 has a function including, for example, xLPF (Extensible Location Free Projection). The xLPF function is an example of a location free projection function. The feature of this function, which will be described later, is that when a user switches the input type to a server, a function of connecting to the server 11 starts automatically and an acquisition of content in the content server 11 becomes possible.

The content server 11 according to the present embodiment will be described as a server having the xLPF function in the following. Needless to say, a content server having an output function other than the xLPF function can implement the technical idea of the present embodiment.

For the content server 12, a technical specification (Guideline) is formulated as a standard adopting the UPnP, for example, by the DLNA (Digital Living Network Alliance). Accordingly, the content server 12 has a function of the DMS (Digital Media Server) conforming to the Guideline formulated by the DLNA. The content server 12 stores content projected by the projector 10 and provides the stored content.

The DLNA Guideline formulates connection conditions between devices, to be commonly handled by the devices, such as a media format (JPEG, LPCM, MPEG2), a media transfer (HTTP (Hyper Text Transfer Protocol)), a communication protocol (IPv4) or a network connectivity (wired LAN, wireless LAN), based on the UPnP, are formulated. When devices have the DLNA function, only by connecting to a network, the devices can be connected to each other without particular setting.

The content server 12 according to the present embodiment will be described as a server having the DLNA function. Meanwhile, the display system 1 may include plural content servers 12.

<Connection Process Sequence>

Figure 2A:
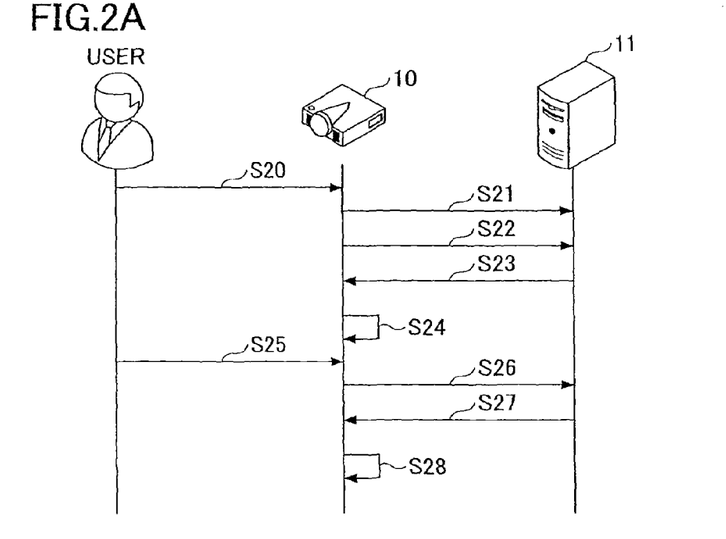
FIGS. 2A and 2B are sequence diagrams illustrating an example of a connection process according to the present embodiment.
Figure 2B:
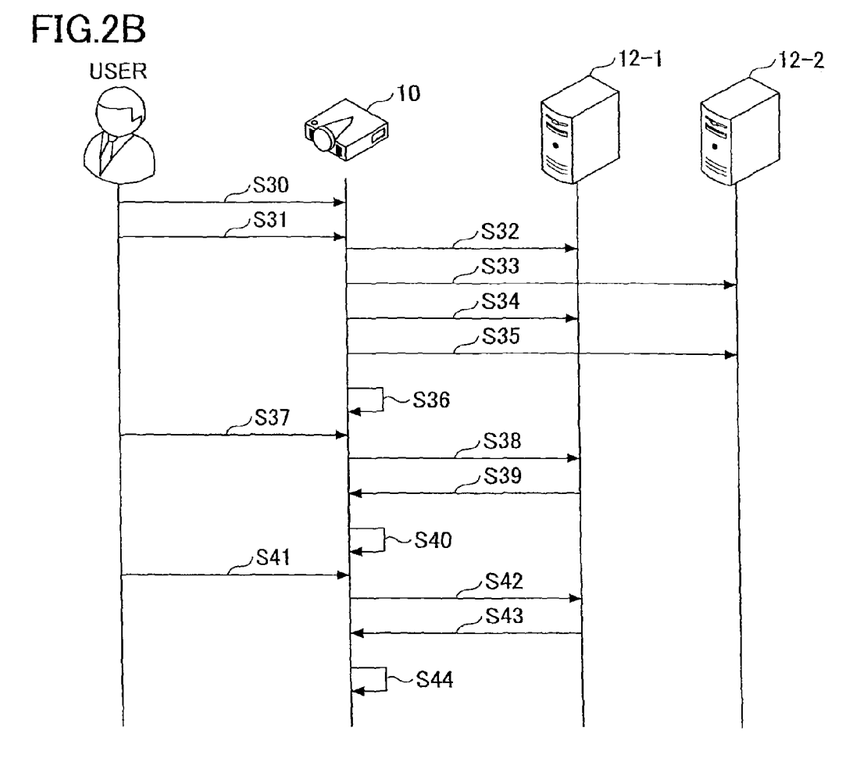

FIGS. 2A and 2B are sequence diagrams illustrating examples of the connection process sequences according to the present embodiment. FIG. 2A schematically shows a process for connection to the content server 11 with the xLPF function. FIG. 2B schematically shows a process for connection to the content server 12 with the DLNA function.

In the example shown in FIG. 2A, when the display device 10 receives an input for switching the input type (step S20) at the input type switch interface 10b, shown in FIG. 3, by the user, the display device 10 is connected immediately with the content server 11 (step S21) with the xLPF function, wherein the content server 11 is registered as a specified server in advance.

The server specification registration that the user executes in advance will be explained in the following.

Figure 4:
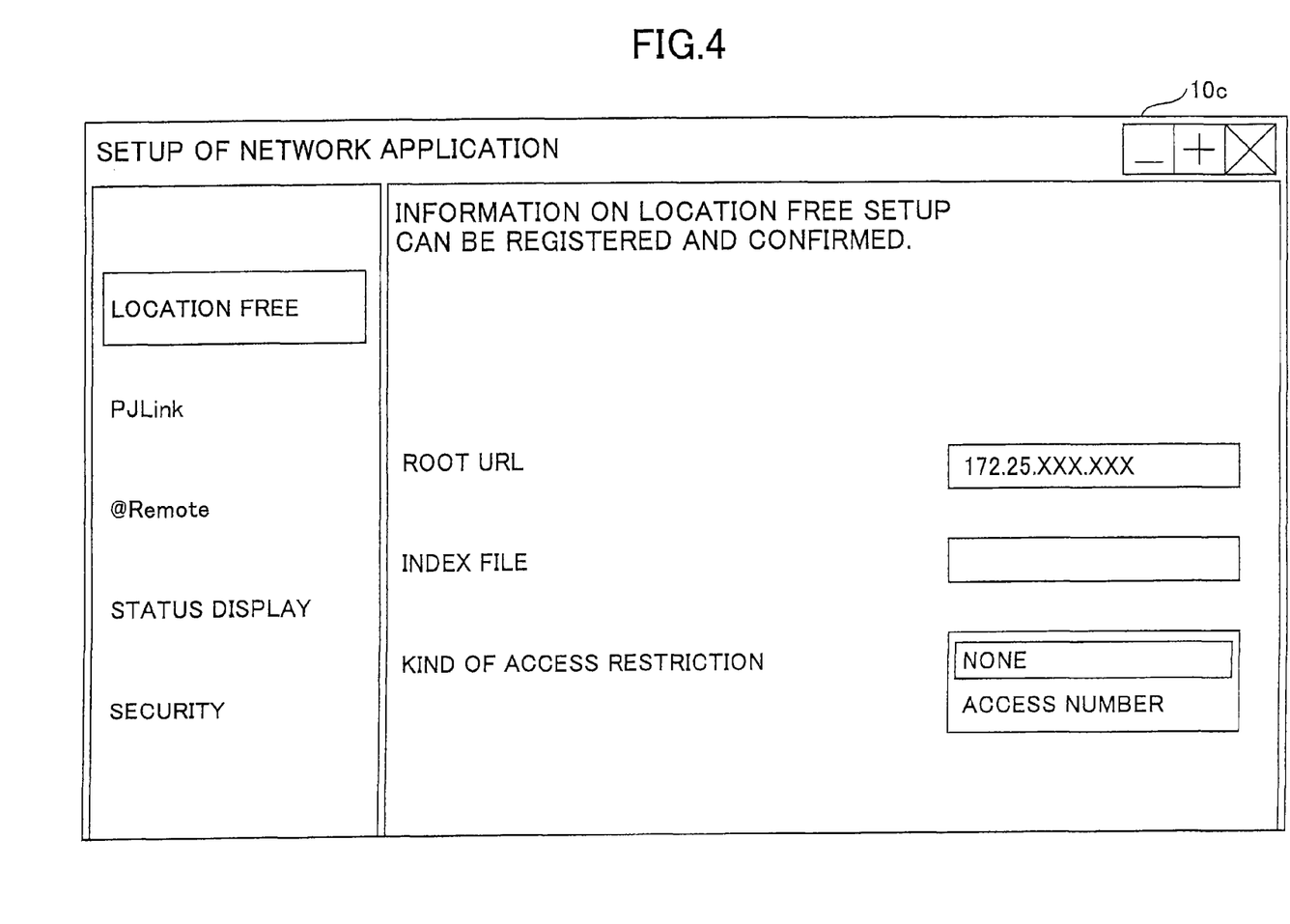
FIG. 4 is a diagram illustrating an example of a server specification screen according to the present embodiment.

FIG. 4 shows an example of a server specification interface 10c in the xLPF function. A preliminary preparation to connect to the content server 11 is made by specifying a "root URL" in advance by the user in the "location free" setup mode on the server specification interface 10c.

The display device 10 requires the content server 11 connected at step S21 to acquire content list information (step S22). When the display device 10 acquires the required list of content from the content server 11 (step S23), the display device displays the list of content on a display screen (step S24).

When the display device 10 receive a selection operation for content by the user (step S25), the display device 10 requires the content server 11 to acquire the selected content (step S26). When the display device 10 acquires the required content from the content server 11 (step S27), the display device 10 starts displaying the acquired content (step S28).

In the example shown in FIG. 2B, the display device receives an input for switching the input type (step S30) at the input type switch interface 10b, shown in FIG. 3, by the user, and receives a search request for the content server 12 having the DLNA function (step S31). Then, the display device 10 executes a search to determine whether the content server 12-1 exists on the network. Similarly, the display device 10 executes a search to determine whether the content server 12-2 exists on the network (step S33).

When the display device 10 finds the content server 12-1 by the search, the display device 10 connects to the content server 12-1 (step S34). Moreover, in the same way, when the display device 10 finds the content serve 12-2 by the search, the display device 10 connects to the content server 12-2 (step S35).

The display device 10 displays on the display screen list information of content servers related to the content servers 12-1 and 12-2 with the DLNA function to which the display device 10 connects.

When the display device 10 receives a request for connection to the content server 12-1 from the user (step S37), the display device 10 requires the content server 12-1 concerned to acquire list information of content (step S38). When the display device 10 acquires the required list of content (step S39), the display device 10 displays the list of content on the display screen (step S40).

When the display device 10 receives a selection operation for content by the user (step S41), the display device 10 requires the content server 12-1 to acquire content (step S42). When the display device 10 acquires the required content from the content server 12-1 (step S43), the display device 10 starts projecting the acquired content (step S44).

As described above, since the user's operation for the connection process to the content server 11 having the xLPF function is different from the user's operation for the connection process to the content server 12 having the DLNA function, a search and a connection of a content server which has a different function (standard) have been difficult.

However, the projector 10 (display device) according to the present embodiment can connect to the content server 11 having the xLPF function and to the content server 12 having the DLNA function only by the operation of switching the input type to "server", which will be described later. In the following, the process will be explained sequentially.

<Projector: Functional Configuration>

Figure 5:
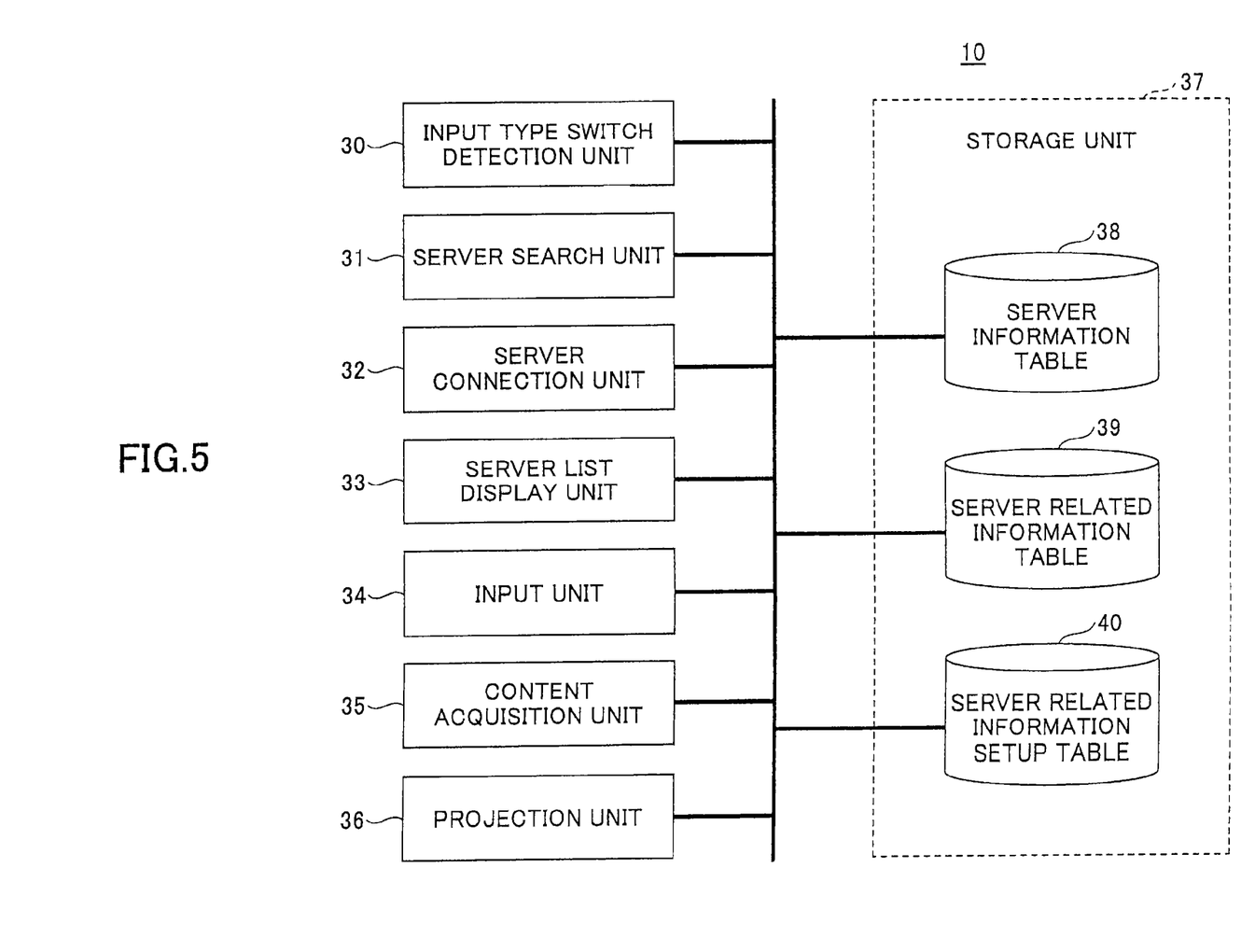
FIG. 5 is a diagram illustrating an example of a functional configuration of a projector according to the present embodiment.

FIG. 5 is a diagram illustrating an example of a functional configuration of the projector 10 according to the present embodiment. As shown in FIG. 5, the projector 10 is configured to include an input type switch detection unit 30, a server search unit 31, a server connection unit 32, a server list display unit 33, an input unit 34, a content acquisition unit 35, a projection unit 36 and a storage unit 37. The storage unit 37 is configured to include a server information table 38, a server related information table 39 and a server related information setup table 40.

The input type switch detection unit 30 receives an input switch request from the input unit 34 and detects whether the input type is switched. The input switch request is to perform switching the input type from the plural input types displayed on an input switch interface 10b, shown in FIG. 3, by the user operating an operation unit 10a (see FIG. 1).

The server search unit 31 searches for a content server existing on the network N. Since the content server 11 having the xLPF function is registered as a specified server in advance, it is not necessary to search for the content server 11. Accordingly, the search for content server in the present embodiment means a search for the content server 12 having the DLNA function.

The server connection unit 32 is a unit that attempts to connect to a content server. The content server to be connected is the content server 11 (LPF function) which is registered as a specified server in the server information table 38 in the storage unit 37 in advance or the content server 12 (DLNA function) searched for by the server search unit 31.

The server list display unit 33 displays a list of all content servers, connections of which have been completed by the server connection unit 32. In the displayed list, which will be described later, both information on servers and information related to servers registered in the server information table 38 and the server related information table 39 in the storage unit 37, respectively, are displayed.

The input unit 34 inputs an operation result for selecting an input type by the user using the operation unit 10a of the projector 10, for changing information on a server or for requiring a server or content.

The content acquisition unit 35 acquires content from a content server concerned according to a server request and a content request input to the input unit 34. In the present embodiment, the content acquisition unit 35 also displays a list of content which is necessary until the acquisition of the content. That is, the process of the content acquisition unit 35 includes a process of requiring the list of content of the content server before acquisition of content, a process of displaying the acquired list of content by the projection unit 36 and a process of making the user require the content.

The projection unit 36 projects the content acquired from the content server concerned in response to a projection request of the content acquisition unit 35.

The storage unit 37 stores information on the content server.

Figure 8:
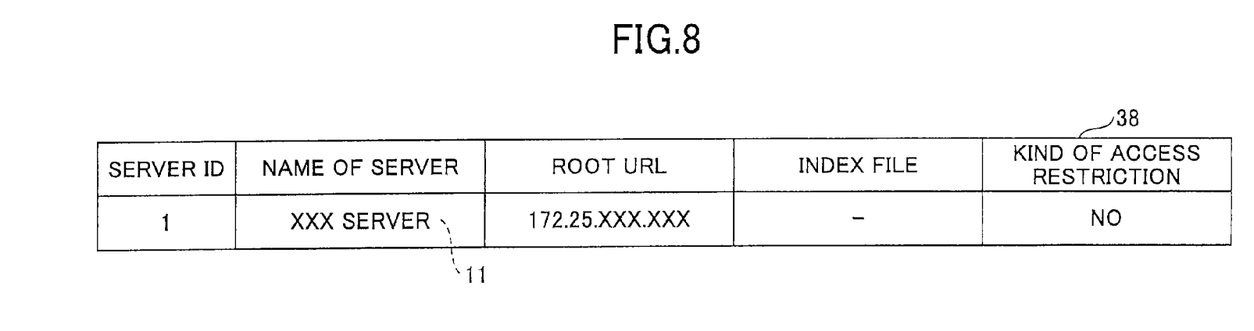
FIG. 8 is a diagram illustrating an example of a server information table according to the first embodiment.

The server information table 38 stores (registered as a specified server) in the storage unit 37 register information for connecting to the content server as shown in FIG. 8, for example. In the present embodiment, it is information on the content server 11 having the xLPF function. For example, a "server ID", a "server name", a "root URL" of the server, an "index file", a "kind of access restriction", or the like is stored. In the example shown in figures, only information on a content server is registered as a specified server, but information on plural content servers may be registered as specified servers. The information on these content servers 11 is, as described above, information registered as specified servers at the server specification interface 10c shown in FIG. 4.

Incidentally, the server search unit 31 does not connect to the content server 11 having the xLPF function which is not stored in the server information table 38.

Figure 9:
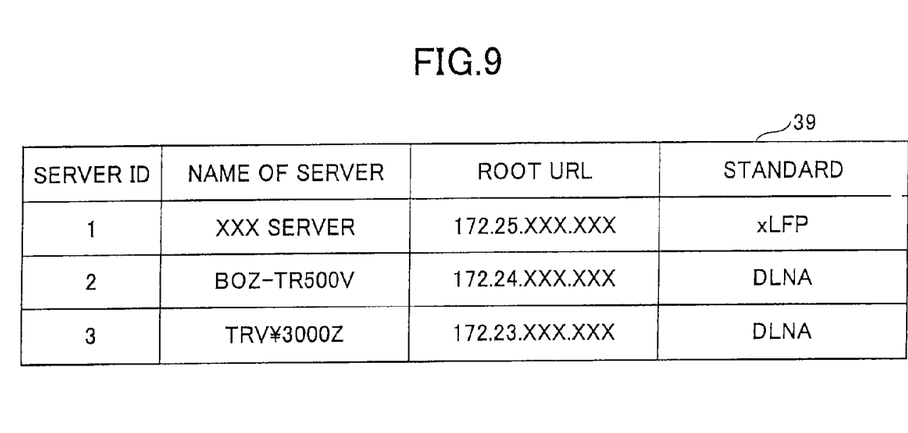
FIG. 9 is a diagram illustrating an example of a server related information table according to the first embodiment.

The server related information table 39 stored (registers) in the storage unit 37 register information on a type of a content server as shown in FIG. 9, for example. The information on a type corresponds to "standard" information provided in the right column in FIG. 9. That is, the information on a type indicates a type of output standard to which each of the content servers corresponds. In the present embodiment, it is "xLPF" or "DLNA". However, "DLNA" is not a standard in a strict sense but is generally a "Guideline", but only in the present application it is described as "DLNA" standard in the sense of the output standard on a server connection.

Figure 11:
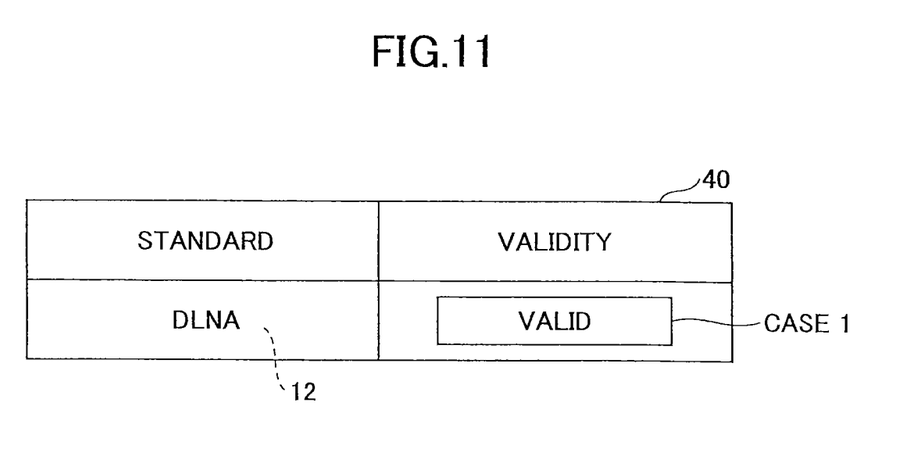
FIG. 11 is a diagram illustrating an example of a server related information setup table according to the second embodiment.

A server related information setup table 40 stored in the storage unit 37 is a table in which the user sets validity of information on the type of the content server registered in the server related information table 39, as shown in FIG. 11, for example. Information on validity, shown in FIG. 11, is "valid", but other items such as "invalid" may be set. Based on the validity information set in the server related information setup table 40, the server search unit 31 performs the search for a content server. Specific processes will be described later.

<Projector: Hardware Configuration>

Figure 6:
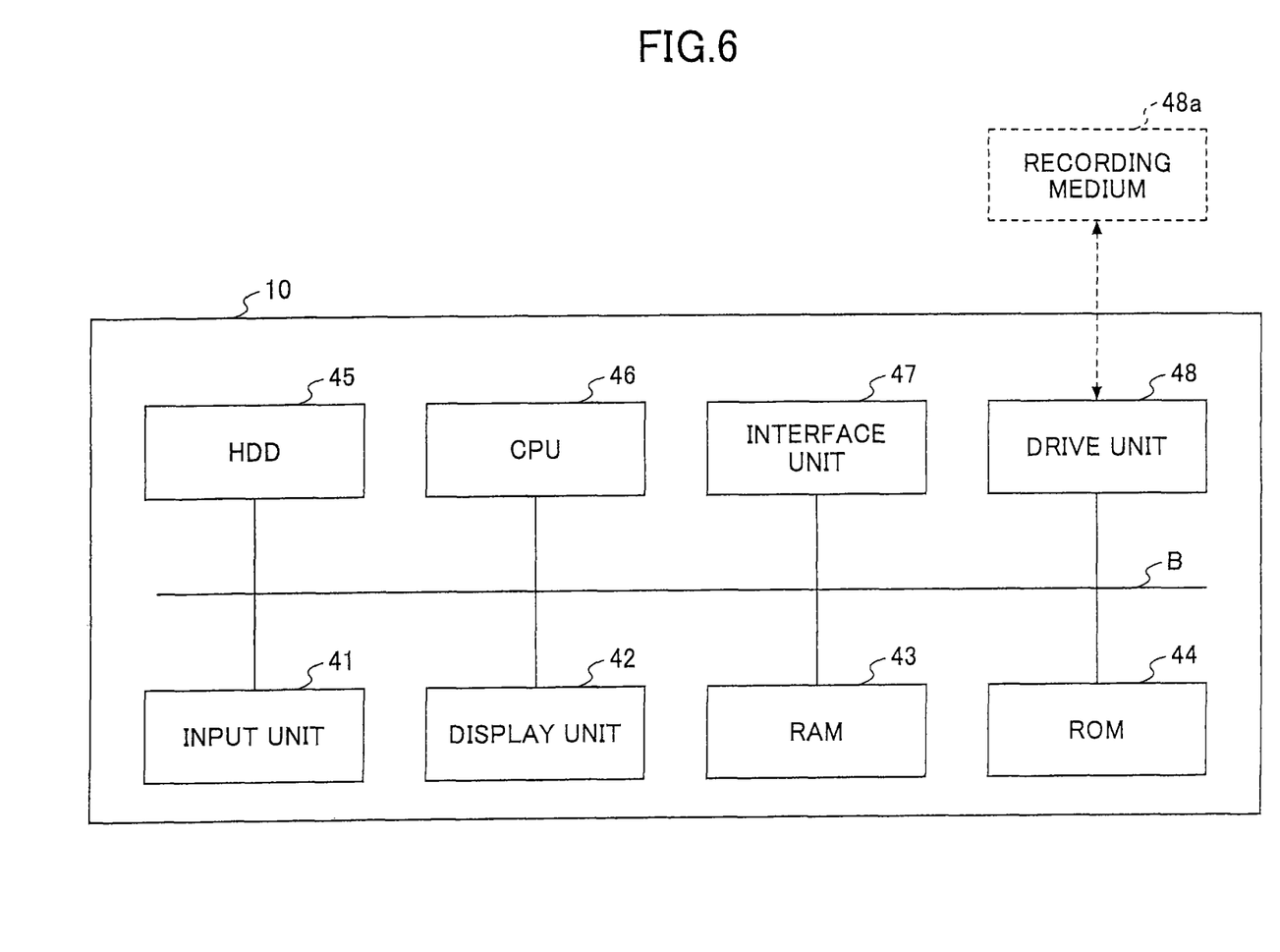
FIG. 6 is a diagram illustrating an example of a hardware configuration of the projector according to the present embodiment.

FIG. 6 is a diagram illustrating an example of a hardware configuration of the projector according to the present embodiment. As shown in FIG. 6, the projector 10 includes an input unit 41, a display unit 42, a RAM (Random Access Memory) 43, a ROM (Read Only Memory) 44, a HDD (Hard Disk Drive) 45, a CPU (Central Processing Unit) 46, an interface unit 47, a drive unit 48, and the like, which are connected via a bus B to each other.

The input unit 41 includes, for example, a main body hard key or the like, and is used for inputting respective operational signals to the projector 10.

The display unit 42 includes, for example, a display screen, a lamp or the like, and displays a result of a process by the projector 10.

The RAM 43 is a volatile semiconductor memory (storage unit) that holds a program or data temporarily.

The ROM 44 is a non-volatile semiconductor memory (storage unit) that can hold internal data even if the power is turned off. In the ROM 44, programs or data such as BIOS (Basic Input/Output System) which is executed at the time of startup of the projector 10, a system setup and network setup are stored.

The HDD 45 is a non-volatile storage device that stores programs or data. The stored programs or data include system software that controls the projector 10 (for example, an OS (Operating System) which is a basic software such as "Windows (trademark registered)" or "UNIX (trademark registered)", and application software that provides various kinds of functions on the system. Moreover, the HDD 45 manages the stored programs or data by a predetermined file system and/or a DB (Data Base).

The CPU 46 reads out a program or data from the above storage unit (for example, the "HDD", "ROM" or the like) onto the RAM 43, and executes the processes, thereby realizing control of the entire apparatus and an included function.

The interface unit 47 is an interface that connects the projector 10 to a transmission path such as a wired or wireless network or the like. The projector 10 can perform data communication with other external devices via the interface unit 47.

The drive unit 48 is an interface to a detachable recording medium 48a. The projector 10 reads data from and writes data into the recording medium 48a via the drive unit 48. The recording medium 48a includes, for example, an SD (Secure Digital) memory card, a USB (Universal Serial Bus) memory or the like. The recording medium 48a can store a program that upon execution by a computer realizes the present embodiment.

Meanwhile, the projector 10 may be configured so that a projector for projecting image data on a screen or the like is connected to a bus B, other than the hardware configuration described as above. The projector 10 can provide various kinds of processes according to the above-described hardware configuration.

First Embodiment

Figure 7:
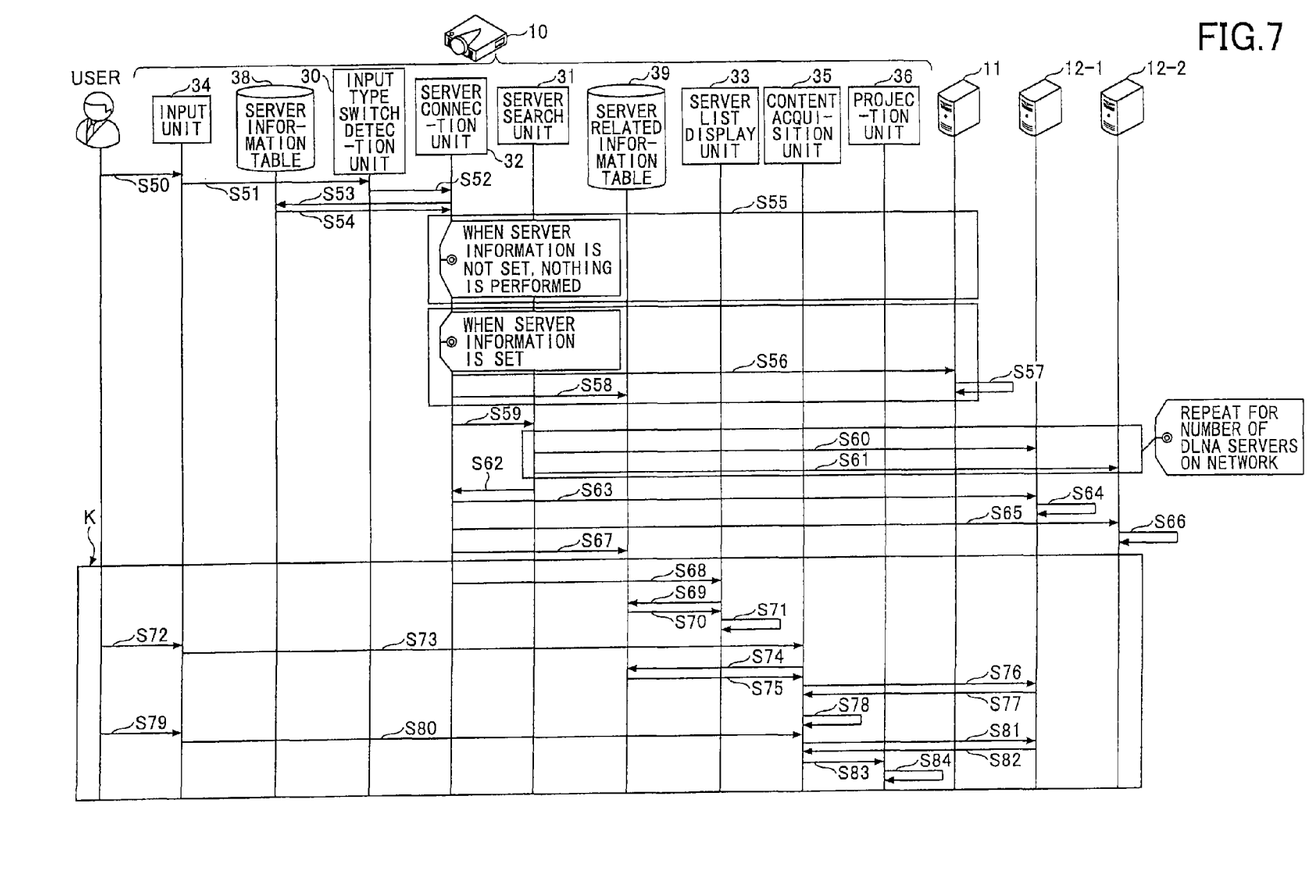
FIG. 7 is a sequence diagram illustrating an example of a server connection process according to the first embodiment.
Figure 10:
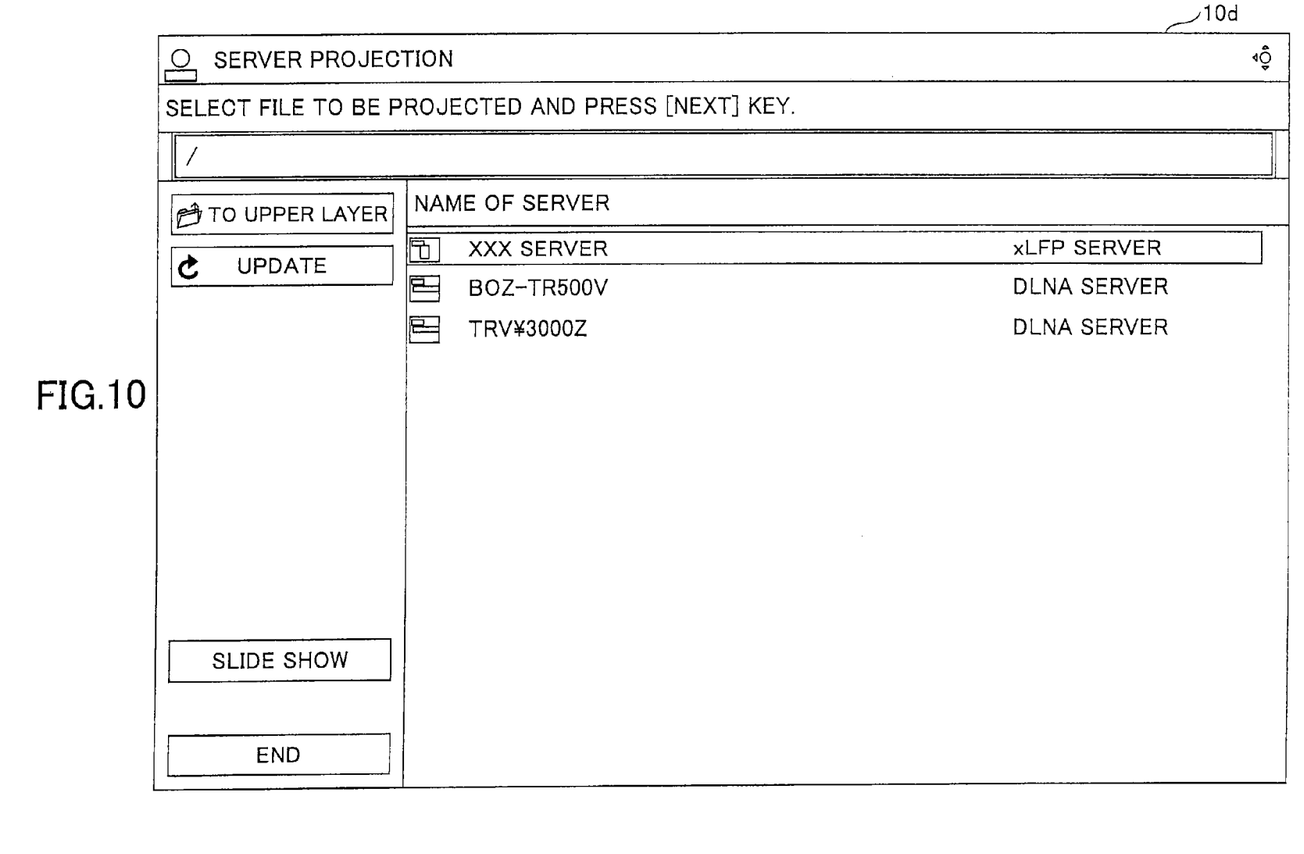
FIG. 10 is a diagram illustrating an example of a server list display screen according to the first embodiment.

FIG. 7 is a sequence diagram illustrating an example of a server connection process according to a first embodiment. FIG. 8 is a diagram illustrating an example of the server information table 38 in the server connection process. FIG. 9 is a diagram illustrating an example of the server related information table 39 in the server connection process. Accordingly, from the server information shown in FIGS. 8 and 9 respectively, for example, a server with "server ID" of 1 is determined to be the content server 11 with the "xLFP" standard. FIG. 10 is a diagram illustrating an example of a list display screen of a connected content server.

The server connection process sequence shown in FIG. 7 includes two connection patterns, i.e. a connection to the content server 11 having the "xLFP" standard, and a connection to the content server 12-1 or 12-2 having the "DLNA" standard.

At first, the connection process to the content server 11 having the "xLFP" standard will be explained.

As shown in FIG. 7, the input unit 34 of the projector 10, for example, receives an input to input type switch (step S50), when the user operates the operation unit 10a of the projector 10 and performs switching an input type at the input type switch interface 10b shown in FIG. 3. The input unit 34 gives notice to the input type switch detection unit 30 that the input type is switched (step S51). When the input type switch detection unit 30 receives the notice of the input type switch, the input type switch detection unit 30 requires the server connection unit 32 to connect the server (step S52).

The server connection unit 32, in order to connect to the content server 11 having the xLFP function, requires the server information table 38 to acquire server information (step S53). The server information is, for example, a "root URL" of the server, shown in FIG. 8.

When the server connection unit 32 acquires the required server information from the server information table 38 (step S54), in the case where there is not a registration as server information, i.e. there is not a registration as a specified server, the server connection unit 32 does not perform the server connection (step S55). In the case where server information is registered in the server information table 38, the server connection unit 32 sends the connection request to the content server 11 in the network N based on the "root URL" which is server information (step S56). The content server 11 performs a connection in response to the request from the server connection unit 32 (step S57). At this stage, the server connection unit 32 acquires related information (xLFP) of the content server 11.

The server connection unit 32 registers the related information (xLFP) of the connected content server 11 in the server related information table 39 (step S58). For example, in the table shown in FIG. 9, for the server with "server ID" of 1, where the "server name" and the "root URL" are registered, "xLFP" is registered in the field of "standard" which is related information.

According to the above-described connection process, the content server 11 having the xLFP function is connected.

Next, the connection process to the content server 12-1 or 12-2 having the DLNA function will be explained in the following.

After the connection processes S50 to S58, as described above, the server connection unit 32 requires the server search unit 31 to search for a server having the DLNA function on the network N, which is not registered as a specified server in the server information table 38 (step S59).

The server search unit 31 searches for a content server 12-1 or 12-2 having the DLNA function in the network N (step S60 or S61). The search is repeated for the number of the content servers having the DLNA function on the network N. The server search unit 31 sends the result of the search to the server connection unit 32 (steps S62).

The server connection unit 32, based on the result of the search acquired from the server search unit 31, requires the content server 12-1 to connect (step S63). The content server 12-1 performs the connection in response to the connection request from the server connection unit 32 (step S64). The server connection unit 32 requires the content server 12-2 to connect (step S65). The content server 12-2 performs the connection in response to the connection request from the server connection unit 32 (step S66). At this stage, the server connection unit 32 acquires the related information (DLNA) of the content servers 12-1 and 12-2.

The server connection unit 32 registers the related information (DLNA) of the connected content servers 12-1 and 12-2 in the server related information table 39 (step S67). For example, in the table shown in FIG. 9, for the servers with "server ID" of 2 and 3, where the "server name" and the "root URL" are registered, "DLNA" is registered in the fields of "standard" which is related information.

According to the above-described connection process, the content server 12 having the DLNA function is connected.

Next, the process of acquiring content that the user desires from the content servers 11, 12-1 and 12-2 connected according to the above process and projecting the content to the projection unit 36 of the projector 10 will be explained.

In the following example, the process of the user selecting the content server 12-1 and sending content in the content server 12-1 to the projection unit 36 will be explained. Incidentally, since when the other content server is selected the sequence of projection process is the same, the explanation of the sequence of projection process for the other content servers will be omitted.

The server connection unit 32 requires the server list display unit 33 to display a list of the content servers connected according to the above process (step S68). The server list display unit 33, upon receiving the request from the server connection unit 32, queries the server related information table 39 to acquire related information of the registered content server (step S69). The server list display unit 33, upon acquiring the related information from the server related information table 39 (step S70), makes the projection unit 36 display a list of all the connected content servers on, for example, the server list interface 10d, as shown in FIG. 10 (step S71). On the server list interface 10d, names of the connected servers and kinds of the "standard" that is related information of the content server are displayed. Accordingly, the user can easily confirm the respective standards of the content servers, and a smooth operation by the user is realized.

The input unit 34 receives a server selection input for the content server 12-1 when the user operates the operation unit 10a of the projector 10 to select from the content servers that can be connected that are displayed in a list on the server list interface 10d (step S72). The input unit 34 gives notice, for example, to the content acquisition unit 35 that the server selection input for the content server 12-1 is received (step S73).

The content output unit 35 queries the server related information table 39 to acquire server related information of the content server 12-1 (step S74), and acquires the "standard" information "DLNA" which is the server related information from the server related information table 39 (step S75).

The content output unit 35 according to the standard of the server related information (DLNA) requires the content server 12-1 to acquire a list of content (step S76). The content output unit 35, upon acquiring the list information of the content from the content server 12-1 (step S77), displays the list of content (step S78).

The input unit 34 receives a selection input for content when the user operates the operation unit 10a of the projector 10 to select from the content in a content list displayed on the screen (step S79). The input unit 34 gives notice to the content server 12-1 of the selected content (step S80). The content output unit 35 requires the content server 12-1 to acquire the content (step S81).

The content output unit 35, upon acquiring the required content from the content server 12-1, requires the projection unit 36 to start projection (step S83). The projection unit 36 in response to the request from the content output unit 35 starts projecting the selected content in the content server 12-1.

As described above, by only a simple operation by the user of switching the input type to "server", the connection process becomes possible for the content server 11 having the xLPF function which is registered as a specified server in advance and to the content server 12 having the DLNA function which is not registered as a specified server. That is, not only the connection to content servers having different standards becomes possible with quite a simple operation, but also the connection switching to a content server having different standards becomes easier, and the convenience is dramatically enhanced. Furthermore, since names of the connected content server are displayed in a list with related information, the selection of a content server having the content that the user desires to output can be performed effectively.

Second Embodiment

Server Related Information Setup Table

FIG. 11 is a diagram illustrating an example of the server related information setup table 40. The server related information setup table 40 is a table in which the user sets validity of the information on the type of the content server registered in the server related information table 39. In FIG. 11, the standard is set "DLNA" and the validity is set "valid". Accordingly, it is related information of the content server 12. This validity information is set by the user operating the operation unit 10a or the like.

The validity of "valid" indicates the ability to execute processes such as the search for a content server, the display of a list or the acquisition of content according to the DLNA standard. The validity of "invalid" indicates not being able to execute the processes according to the DLNA standard.

Based on the validity information set in the server related information setup table 40, the server search unit 31 searches for a content server. Accordingly, in the case of the setup for the server related information setup table 40 shown in FIG. 11 (case 1), the server search unit 31 searches the content for server 12 having the "DLNA" standard in the network N.

In the following example, the case 1 in which the validity is set to "valid" for the content server 12 having the DLNA function will be explained. Moreover, in conjunction with it the case where the validity is set to "invalid" will also be explained.

<Server Connection Process Sequence in the Second Embodiment>

Figure 12:
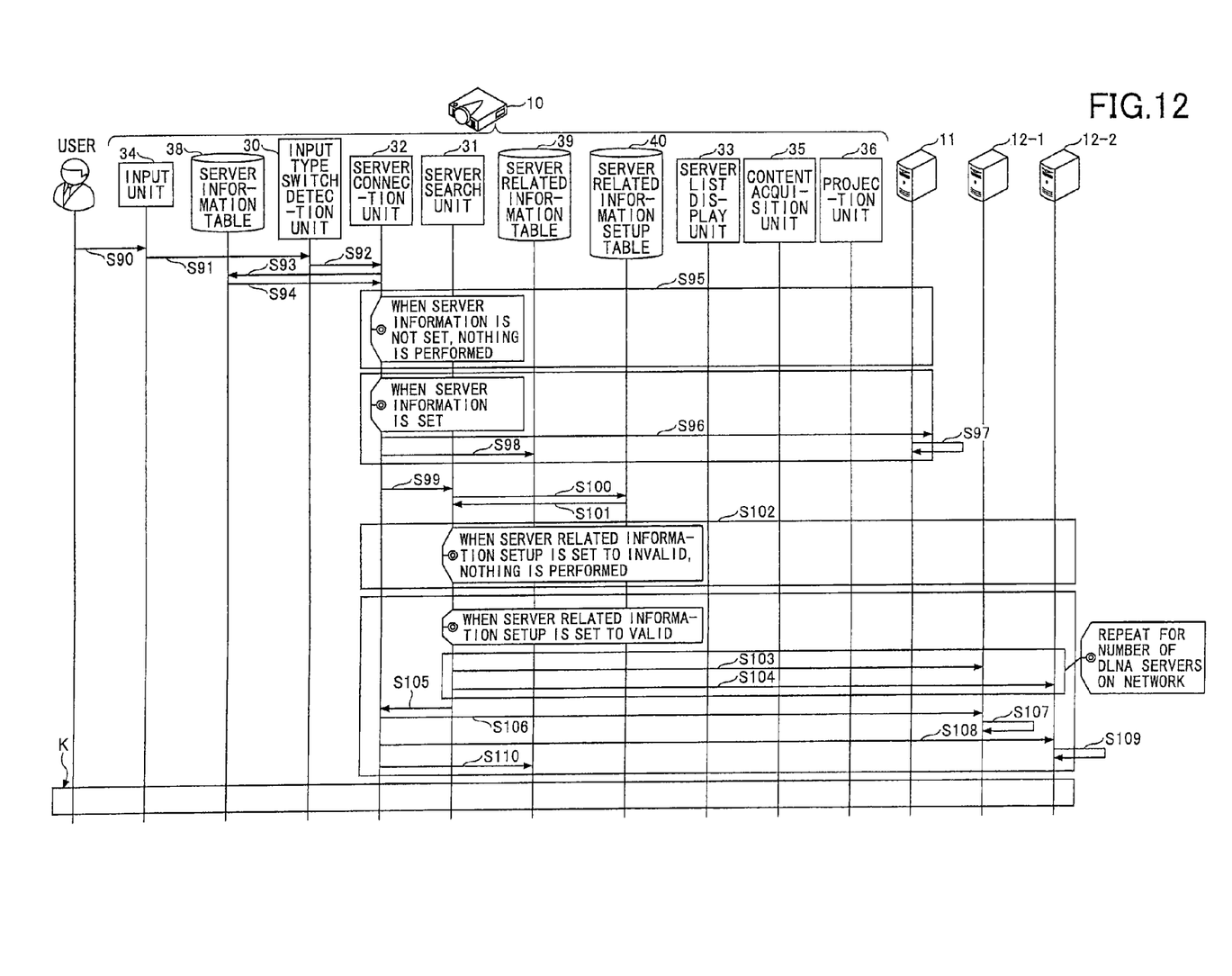
FIG. 12 is a sequence diagram illustrating an example of a server connection process according to the second embodiment.

FIG. 12 is a sequence diagram illustrating an example of a server connection process according to the second embodiment. Although FIG. 12 explains case 1 to connect to the content server 12 having the DLNA function shown in FIG. 11, at first, the case where the validity is set "invalid" in the server related information setup table 40 will be explained.

Processes from step S90 to step S98 shown in FIG. 12 are the same as the processes from step S50 to step S58 shown in FIG. 7, and specific explanation will be omitted here.

After connecting to the content server 11 having the xLPF function according to the connection processes from step S90 to step S98, the server connection unit 32 requires the server search unit 31 to search for a server having the DLNA function which is not registered as a specified server in the server information table 38 (step S99).

The server search unit 31, before executing the server search in the network N, queries the server related information setup table 40 to acquire validity information on the type of the content server 12 which is set by the user (step S100). The server search unit 31, upon determining that the validity information on the type of the server is "invalid" from the server related information setup table 40 (step S101), does not search for a server (step S102). Accordingly, the search time can be shortened.

The server search unit 31, upon determining that the validity information on the type of the server is "valid" from the server related information setup table 40 (step S101), (case 1 shown in FIG. 11) performs the search for the content servers 12-1, 12-2 having the DLNA function in the network N. The process of the search is repeated for the number of the content servers having the DLNA function on the network N. The server search unit 31 sends the result of the search to the server connection unit 32 (steps S105).

The server connection unit 32 requests the content server 12-1 to connect based on the search result acquired from the server search unit 31 (step S106). The content server 12-1 performs the connection in response the connection request by the server connection unit 32 (step S107). The server connection unit 32 requests the content server 12-2 to connect (step S108). The content server 12-2 performs the connection in response to the connection request by the server connection unit 32 (step S109). At this stage, the server connection unit 32 acquires the related information (DLNA) of the content servers 12-1 and 12-2.

The server connection unit 32 registers the related information (DLNA function) of the connected content servers 12-1 and 12-2 in the server related information table 39 (step S110). For example, as "server ID=2, 3" in FIG. 9, "server name" and "root URL" are registered, and in the column of "standard" which is related information "DLNA" is registered.

As described above, based on the validity information set in the server related information setup table 40 (case 1), the connection to the content server 12 having the DLNA function is performed. Accordingly, while eliminating wasting time for searching, even if a content server, an existence of standard (type) of which is not understood by the user, exists on the network N, it can be definitely searched for and detected and connected.

The projection process sequence of the user acquiring desired content from the plural content servers connected according to the processes as described above, and projecting to the projection unit 36 of the projector 10 is the same as the projection process sequence K described from step S68 to step S84 in FIG. 7. Accordingly, the explanation will be omitted.

According to the above described embodiment, the same connection control can be realized for a display request or the like to display content on a display unit of an information device such as a PC or a tablet-type terminal, other than the display request to project content on the display unit 36 to display. Accordingly, the convenience for the user can be enhanced. Meanwhile, the system configuration to which the display device and the content server are connected, explained in the above described embodiment is an example, and various systems may be configured according to a usage or a purpose.

Further, the present invention is not limited to these embodiments, but various variations and modifications may be made without departing from the scope of the present invention.

The present application is based on and claims the benefit of priority of Japanese Priority Application No. 2013-130637 filed on Jun. 21, 2013, the entire contents of which are hereby incorporated by reference.

What is claimed is:

1. A display apparatus connected to a content server that stores content for reproduction on the display apparatus via a network, comprising:
    a processor; and
    a memory, wherein the processor is configured to:
        receive an input type of content for the display apparatus;
        detect switching of the input type in response to the received input type;
        store information on the content server that stores content for reproduction on the display apparatus connected to the display apparatus in the memory;
        search for a content server that stores content for reproduction on the display apparatus in the network;
        upon detecting switching of the input type for switching to an input from a content server that stores content for reproduction on the display apparatus, connect to at least one of a content server that stores content for reproduction on the display apparatus specified by the information stored in the memory and a searched for content server that stores content for reproduction on the display apparatus that is detected; and
        reproduce content acquired from the at least one of the content server that stores content for reproduction on the display apparatus specified by the information stored in the memory and the searched for content server that stores content for reproduction on the display apparatus that is detected.

2. The display apparatus as claimed in claim 1, wherein the processor is further configured to:
    display a list of the content servers that are connected.

3. The display apparatus as claimed in claim 1, wherein the memory includes a server information table in which the information of the content server is registered for a name of the content server and a server related information table in which the information of the content server and information of a type of the content server are registered, the information of the content server being connected to the information of the type of the content server, and
    the processor is configured to display the name of the content server and related information of the content server registered in the server related information table.

4. The display apparatus as claimed in claim 3, wherein the memory includes a server related information setup table in which information of a validity of a type of a content server registered in the server related information table is set by a user, and
    the processor is configured to search for the content server based on the information of the validity set in the server related information setup table.

5. The display apparatus as claimed in claim 4, wherein in the server related information setup table, either "valid" or "invalid" is set for the information of the validity.

6. The display apparatus as claimed in claim 5, wherein when the information of the validity set in the server related information setup table indicates "valid", the processor searches for the content server, and
    when the information of the validity set in the server related information setup table indicates "invalid", the processor does not search for the content server.

7. The display apparatus as claimed in claim 1, wherein
the content server that stores content for reproduction on the display apparatus specified by the information stored in the memory is a first type,
the searched for content server that stores content for reproduction on the display apparatus is a second type, and
the first type is different from the second type.

8. The display apparatus as claimed in claim 7, wherein the first type is a connection process that is different from the second type.

9. The display apparatus as claimed in claim 7, wherein the first type is a connection standard that is different from the second type.

10. The display apparatus as claimed in claim 9, wherein the first type is an Extensible Location Free Projection.

11. The display apparatus as claimed in claim 9, wherein the second type is a Digital Living Network Alliance.

12. The display apparatus as claimed in claim 9, wherein
the first type is an Extensible Location Free Projection, and
the second type is a Digital Living Network Alliance.

13. A display system including a display apparatus and a content server that stores content for reproduction on the display apparatus which is connected to the display apparatus via a network, the display apparatus comprising:
a processor; and
a memory, wherein the processor is configured to:
receive an input type of content for the display apparatus;
detect switching of the input type in response to the received input type;
store information on the content server that stores content for reproduction on the display apparatus connected to the display apparatus in the memory;
search for a content server that stores content for reproduction on the display apparatus in the network;
detecting switching of the input type for switching to an input from a content server that stores content for reproduction on the display apparatus, connect to at least one of a content server that stores content for reproduction on the display apparatus specified by the information stored in the memory and a searched for content server that stores content for reproduction on the display apparatus that is detected;
display a list of the content servers that are connected; and
reproduce content acquired from the at least one of the content server that stores content for reproduction on the display apparatus specified by the information stored in the memory and the searched for content server that stores content for reproduction on the display apparatus that is detected.

14. The display system as claimed in claim 13, wherein the list of the content servers includes the content server that stores content for reproduction on the display apparatus specified by the information stored in the memory and the searched for content server that stores content for reproduction on the display apparatus that is detected.

15. The display system as claimed in claim 14, wherein
the content server that stores content for reproduction on the display apparatus specified by the information stored in the memory is a first type,
the searched for content server that stores content for reproduction on the display apparatus is a second type, and
the first type is different from the second type.

16. The display system as claimed in claim 15, wherein the first type is a connection process that is different from the second type.

17. The display system as claimed in claim 15, wherein the first type is a connection standard that is different from the second type.

18. The display system as claimed in claim 17, wherein
the first type is an Extensible Location Free Projection, and
the second type is a Digital Living Network Alliance.

19. A non-transitory computer-readable storage medium storing a program for causing a display apparatus, that is connected to a content server that stores content for reproduction on the display apparatus via a network and includes a memory that stores information on the content server connected to the display apparatus, to perform a process of displaying content, the process of displaying content comprising:
an input type reception step of receiving an input type of content for the display apparatus;
an input type switching detection step of detecting switching of the input type in response to the received input type;
a server search step of searching for a content server that stores content for reproduction on the display apparatus in the network;
a server connection step of, upon detecting switching of the input type for switching to an input from a content server that stores content for reproduction on the display apparatus, connecting to at least one of a content server that stores content for reproduction on the display apparatus specified by the information stored in the memory and a content server that stores content for reproduction on the display apparatus searched for and detected in the server search step; and
a content reproduction step of reproducing content acquired from the at least one of the content server that stores content for reproduction on the display apparatus specified by the information stored in the memory and the content server that stores content for reproduction on the display apparatus searched for and detected in the server search step.

* * * * *